(12) United States Patent
Lee et al.

(10) Patent No.: US 11,152,736 B1
(45) Date of Patent: Oct. 19, 2021

(54) HIGH VOLTAGE SHIELDED CONNECTOR

(71) Applicants: HYUNDAI MOTOR COMPANY, Seoul (KR); KIA MOTORS CORPORATION, Seoul (KR); Kyungshin Corp., Incheon (KR)

(72) Inventors: Kwang Moo Lee, Suwon-si (KR); Taekyou Kim, Incheon (KR)

(73) Assignees: Hyundai Motor Company, Seoul (KR); Kia Motors Corporation, Seoul (KR); KYUNGSHIN CORP., Incheon (KR)

( * ) Notice: Subject to any disclaimer, the term of this patent is extended or adjusted under 35 U.S.C. 154(b) by 0 days.

(21) Appl. No.: 17/083,923

(22) Filed: Oct. 29, 2020

(30) Foreign Application Priority Data

Apr. 14, 2020 (KR) .......................... 10-2020-0045449

(51) Int. Cl.
| | |
|---|---|
| *H01R 13/506* | (2006.01) |
| *H01R 13/6591* | (2011.01) |
| *H01R 13/52* | (2006.01) |
| *H01R 13/648* | (2006.01) |
| *H01R 13/6593* | (2011.01) |

(52) U.S. Cl.
CPC ....... *H01R 13/506* (2013.01); *H01R 13/5202* (2013.01); *H01R 13/5213* (2013.01); *H01R 13/65912* (2020.08); *H01R 13/5205* (2013.01); *H01R 13/648* (2013.01); *H01R 13/6593* (2013.01)

(58) Field of Classification Search
CPC ............ H01R 13/506; H01R 13/65912; H01R 13/5202; H01R 13/5213; H01R 13/6593; H01R 13/648
See application file for complete search history.

(56) References Cited

U.S. PATENT DOCUMENTS

| | | | | |
|---|---|---|---|---|
| 5,882,226 A | * | 3/1999 | Bell ................. | H01R 13/65912 |
| | | | | 439/582 |
| 5,929,383 A | * | 7/1999 | Marik .................. | H01R 13/648 |
| | | | | 174/78 |
| 6,048,227 A | * | 4/2000 | Rupp .................... | H01R 9/0521 |
| | | | | 439/607.41 |
| 2005/0118870 A1 | * | 6/2005 | Schreier ............... | H01R 13/648 |
| | | | | 439/607.41 |

\* cited by examiner

*Primary Examiner* — Tho D Ta
(74) *Attorney, Agent, or Firm* — Morgan, Lewis & Bockius LLP

(57) ABSTRACT

A high voltage shielded connector includes an inner housing accommodating a connection portion between an end of a cable and a connection terminal, a metal shielding member covering the inner housing, a binding ring binding an end of a braided net covering the cable to an outer surface of the metal shielding member, an outer housing covering the outer surface of the metal shielding member, a binding portion of the metal shielding member bound to the binding ring being exposed from the outer housing, a braided net cover covering a portion of the braided net which covers the cable and the binding ring and having an end coupled to the outer housing in a sealed state, and an outer binding member covering a portion where the braided net cover and the outer housing are coupled and maintaining the binding of the braided net cover and the outer housing.

9 Claims, 6 Drawing Sheets

HIGH VOLTAGE SHIELDED CONNECTOR

CROSS-REFERENCE TO RELATED APPLICATION(S)

This application is based on and claims priority under 35 U.S.C. § 119 to Korean Patent Application No. 10-2020-0045449, filed on Apr. 14, 2020, in the Korean Intellectual Property Office, the disclosure of which is incorporated by reference herein in its entirety.

TECHNICAL FIELD

The disclosure relates to a high voltage shielded connector capable of protecting a braided net connection portion.

BACKGROUND

Batteries, inverters, electric motors, and the like of eco-friendly vehicles such as electric vehicles are connected to each other by cables. Connectors connected to ends of cables may transmit high voltage currents by being electrically connected to devices.

However, the cables may cause a malfunction of a vehicle, as a magnetic field generated in a process of transmitting high voltage currents affects sensors or electronic devices. Therefore, a magnetic field shielding means such as a braided net is installed on the outside of a high voltage current cable, and a high voltage shielded connector capable of shielding a magnetic field is connected at opposite ends thereof.

A braided net is made by weaving metal wires in a tubular shape. A braided net is connected to a high voltage shield connector so that opposite ends thereof may be grounded in a state of being installed to surround the outside of one or more cables.

A high voltage shielded connector includes a metal shielding member surrounding the outside of a cable and a connection terminal. One end of a braided net installed outside a cable is bound to a metal shielding member in a state of being in close contact with an outer surface of the metal shielding member using a binding ring.

However, because a connection portion between the metal shielding member and the braided wire of such a high-voltage shielded connector is exposed to the outside, the connection portion between the metal shielding member and the braided wire may be in contact with moisture to be easily corroded. In addition, when an external force acts on the connection portion between the metal shielding member and the braided net, the braided net may be separated from the metal shielding member.

SUMMARY

It is an aspect of the disclosure to provide a high voltage shielded connector capable of blocking moisture inflow from the outside by sealing the outside of a braided net connection portion.

It is another aspect of the disclosure to provide a high voltage shielded connector capable of protecting by covering a braided net connection portion and strengthening the binding of the braided net connection portion.

Additional aspects of the disclosure will be set forth in part in the description which follows and, in part, will be obvious from the description, or may be learned by practice of the disclosure.

In accordance with an aspect of the disclosure, a connector includes an inner housing accommodating a connection portion between an end of a cable and a connection terminal, a metal shielding member covering an outer surface of the inner housing, a binding ring bind an end of a braided net covering the cable to an outer surface of the metal shielding member, an outer housing covering the outer surface of the metal shielding member, a binding portion of the metal shielding member bound to the binding ring being exposed from the outer housing, a braided net cover covering a portion of the braided net which covers the cable and the binding ring and having an end coupled to the outer housing in a sealed state, and an outer binding member covering a portion where the braided net cover and the outer housing are coupled and maintaining the binding of the braided net cover and the outer housing.

The outer housing may include a coupling groove at an end to allow the end of the braided net cover to enter and be coupled.

The connector may further include a first locking step extending along a circumference of an outer surface of the braided net cover, a second locking step provided on an inner surface of the outer binding member to be caught on the first locking step, a plurality of locking protrusions provided on an outer surface of the outer housing, and a plurality of locking grooves provided on the outer binding member to be fastened to the plurality of locking protrusions.

The braided net cover may include an elastically deformable material.

A distance from an end of the braided net cover entering the coupling groove to the first locking step may be configured to be longer than a depth of the coupling groove.

The first locking step may be configured to maintain in a state of being spaced apart from an end of the outer housing before the outer binding member is fastened.

The first locking step may be configured to contact with an end of the outer housing by being elastically deformed after the outer binding member is fastened.

The braided net cover may include at least one sealing lip provided continuously along a circumference of the end entering the coupling groove and being in contact with an inner surface of the coupling groove to seal a gap.

The sealing lip may have a mountain shape in cross section and may be integral with the braided net cover.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
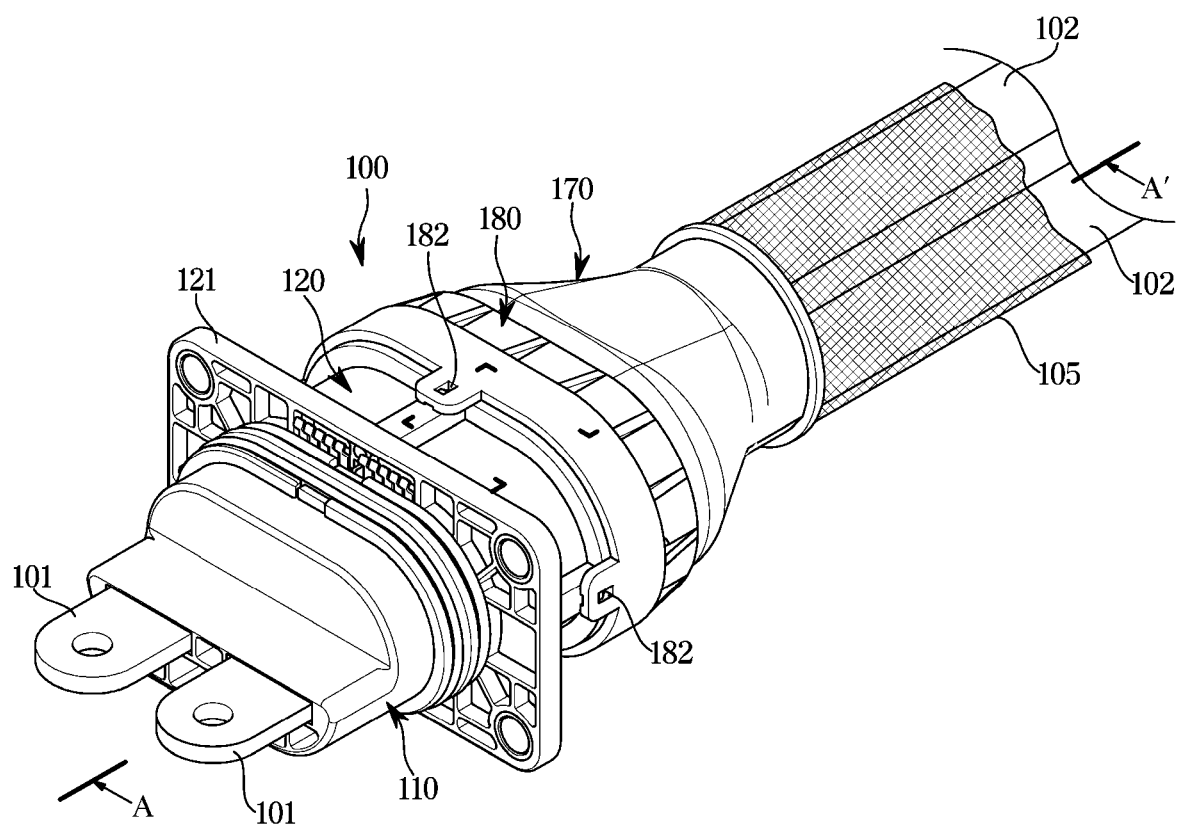
FIG. 1 is a perspective view of a high voltage shielded connector according to an embodiment of the disclosure.
Figure 2:
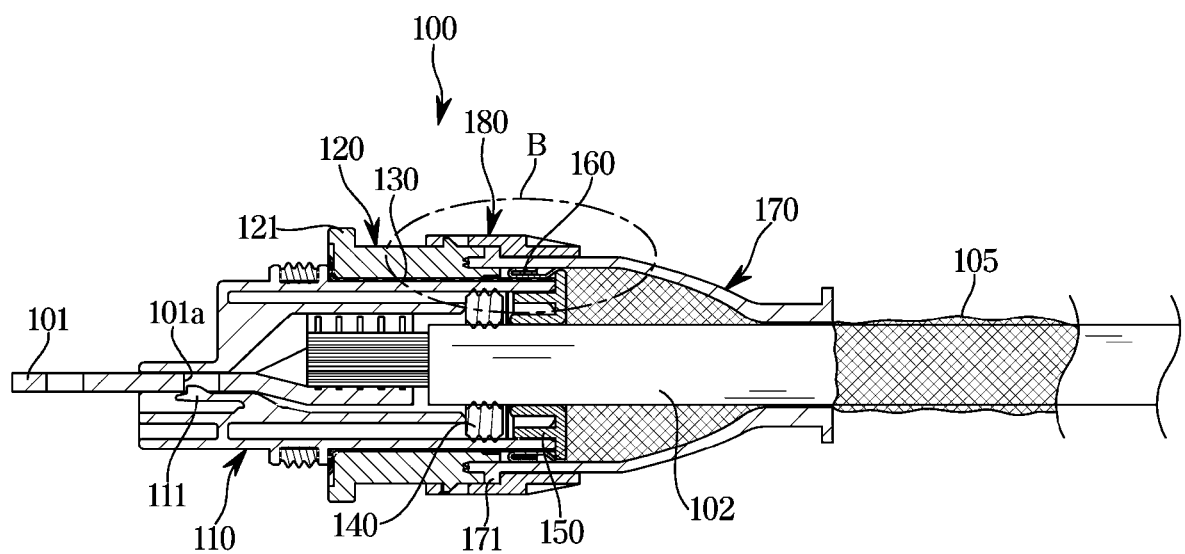
FIG. 2 is a cross-sectional view taken along line A-A' in FIG. 1.
Figure 3:
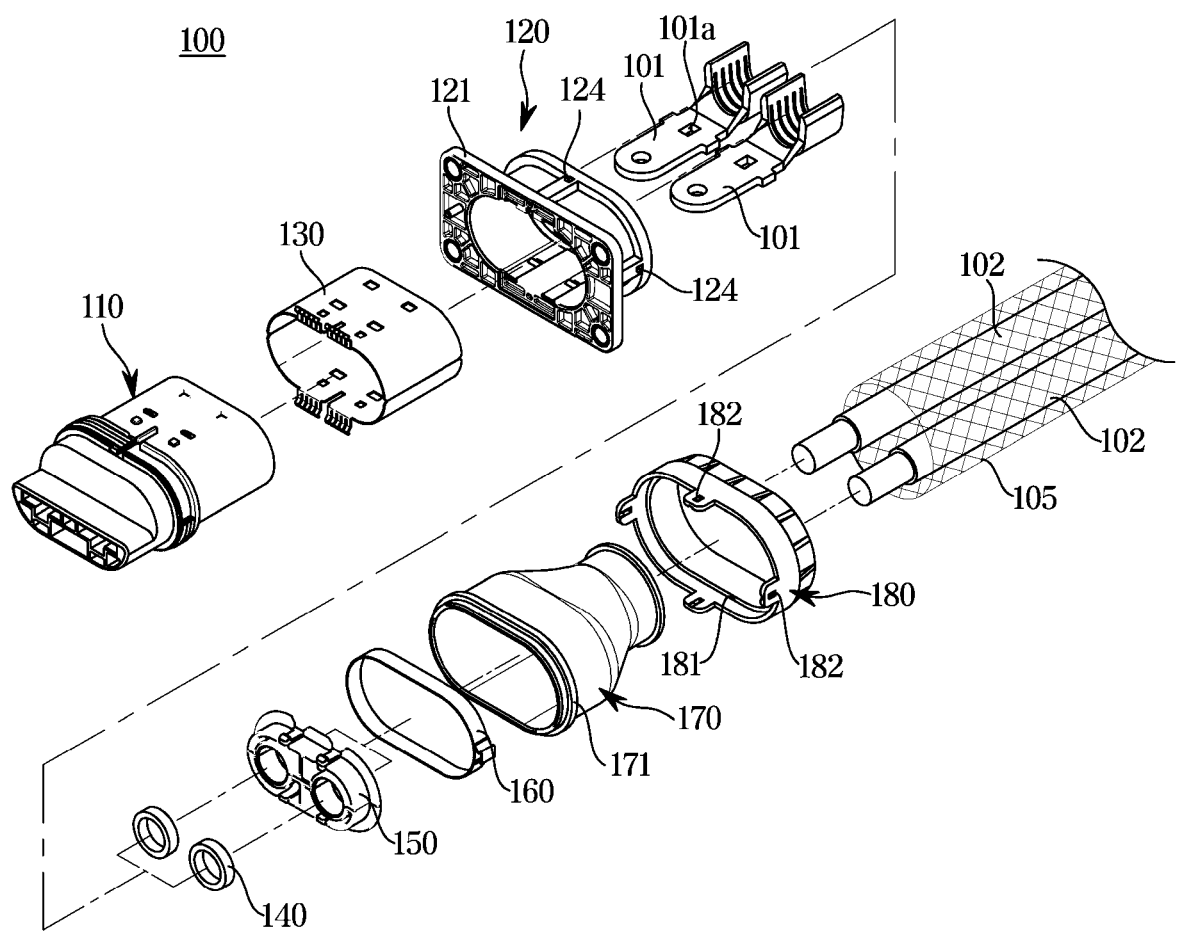
FIG. 3 is an exploded perspective view of the high voltage shielded connector according to an embodiment of the disclosure.

FIG. 1 is a perspective view of a high voltage shielded connector according to an embodiment of the disclosure, FIG. 2 is a cross-sectional view taken along line A-A' in FIG. 1, and FIG. 3 is an exploded perspective view of the high voltage shielded connector according to an embodiment of the disclosure.

Referring to FIGS. 1 to 3, a high voltage shielded connector 100 includes a connection terminal 101, an inner housing 110, an outer housing 120, a metal shielding member 130, a cable seal 140, a cable holder 150, a binding ring 160, a braided net cover 170, and an outer binding member 180.

A plurality of the connection terminals 101 may be provided and are connected to ends of a plurality of cables 102, respectively. A portion of the connection terminal 101 extends outward from the inner housing 110 to be connected to a connector (not shown) of a device, and a portion coupled to an end of the cable 102 is accommodated in the inner housing 110.

The inner housing 110 is made of an insulating material, and accommodates a portion at which an end of the cable 102 and the connection terminal 101 are connected. The connection terminal 101 and the cable 102 may be installed to enter the inner housing 110 after being connected to each other outside. As illustrated in FIG. 2, the connection terminal 101 may be mounted on the inner housing 110 without shaking as a locking groove 101a is caught on a locking protrusion 111 inside the inner housing 110.

The cable seal 140 made of an elastic material may be installed inside the inner housing 101 in order to seal a connection portion between the connection terminal 101 and the cable 102. The cable holder 150 for stably fixing the cable 102 may be installed at a rear end of the inner housing 110 on the opposite side of the connection terminal 101.

The metal shielding member 130 may be made of aluminum, magnesium, copper, steel or the like and formed in a cylindrical shape having an oval cross section. The metal shielding member 130 covers an outer surface of a rear portion of the inner housing 110 to shield magnetic fields and electromagnetic waves. The metal shielding member 130 is connected to an end of a braided net 105 installed to surround the outside of the one or more cables 102.

The end of the braided net 105 is electrically connected to the metal shielding member 130 by fastening the binding ring 160 to the outside thereof in a state of covering an outer surface of the metal shielding member 130. The binding ring 160 is made of a metal material and compressed to tighten the outside of the braided net 105 to bind the end of the braided net 105 to the outer surface of the metal shielding member 130.

The outer housing 120 is installed to cover the remaining area of the outer surface of the metal shielding member 130 except for an area to which the binding ring 160 is bound. The external housing 120 may include a fastening part 121, which is provided in the form of a flange and to which a plurality of fixing screws are fastened, at one end thereof to be fixed to the connector of the device.

Figure 4:
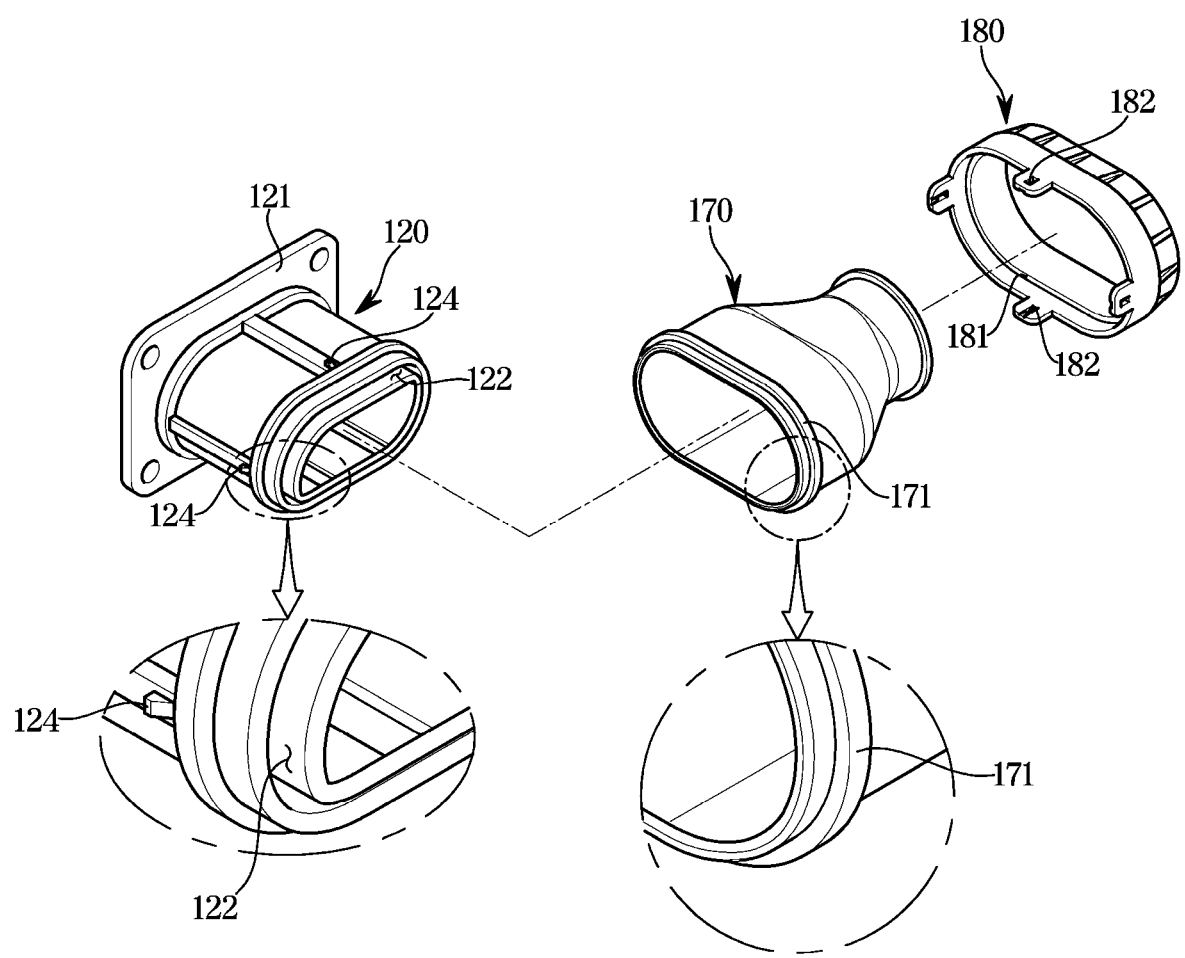
FIG. 4 is a perspective view illustrating a detailed structure of an outer housing, a braided net cover, and an outer binding member of the high voltage shielded connector according to an embodiment of the disclosure.
Figure 5:
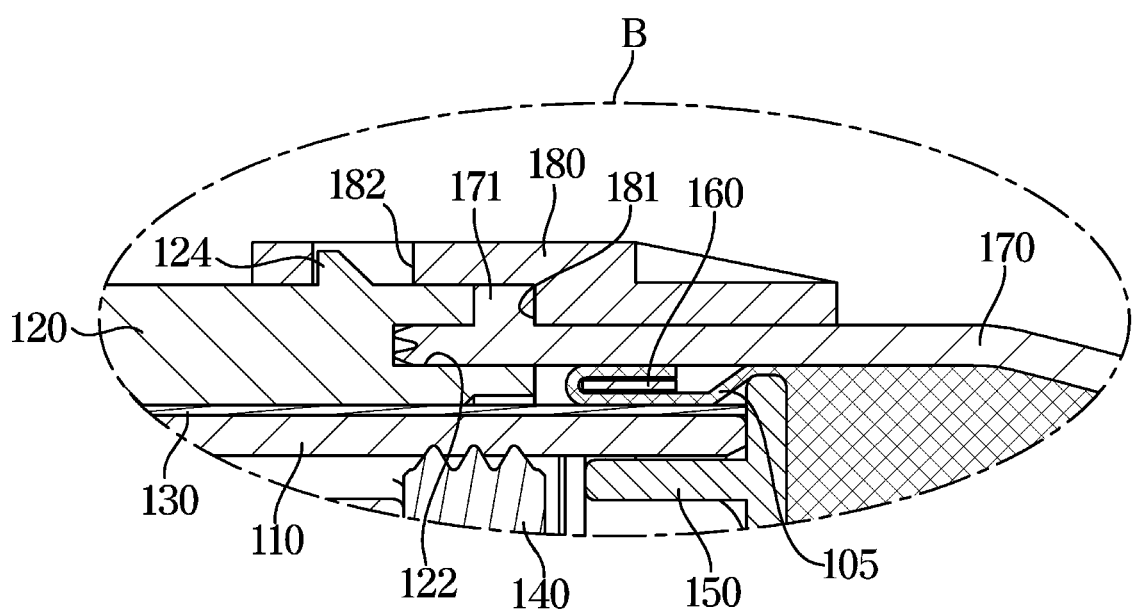
FIG. 5 is a detailed view of part B in FIG. 2.

Referring to FIGS. 3 to 5, the braided net cover 170 covers and protects a portion of the braided net 105, which is positioned at the outside of the cable 102, and the outside of the binding ring 160. An end of the braided net cover 170 on the outer housing 120 side is coupled to the outer housing 120 in a sealed state. The outer housing 120 includes a coupling groove 122 formed continuously in a circumferential direction at an end thereof to which the braided net cover 170 is coupled so that the end of the braided net cover 170 may enter and be coupled thereto.

The braided net cover 170 may be made of an elastically deformable material such as rubber, silicone, and soft resin. The braided net cover 170 may protect a connection portion (a binding ring fastening portion) of the braided net 105 from an external impact and moisture inflow by covering and protecting the outside of a portion where the braided net 105 is connected to the metal shielding member 130.

The outer binding member 180 is installed to cover the outside of a portion where the braided net cover 170 and the outer housing 120 are coupled and maintains the binding between the braided net cover 170 and the outer housing 120.

Referring to FIGS. 4 and 5, the high voltage shielded connector 100 includes the outer housing 120, the braided net cover 170, and a binding means for firmly fastening the outer fastening member 180. The binding means may include a first locking step 171, a second locking step 181, a plurality of locking protrusions 124, and a plurality of locking grooves 182.

The first locking step 171 protrudes from an outer surface of the braided net cover 170 adjacent to one end coupled to the outer housing 120 and is continuously formed along a circumference of the braided net cover 170. The second locking step 181 is formed in a step shape on an inner surface of the outer binding member 180 so that the first locking step 171 of the braided net cover 170 may be caught thereon when the outer binding member 180 is fastened.

The plurality of locking protrusions 124 protrudes from an outer surface of the outer housing 120, and the plurality of locking grooves 182 is provided on the outer fastening member 180 to be fastened to the plurality of locking protrusions 124 in a corresponding manner, respectively.

Therefore, when the braided net cover 170 is mounted and then the outer binding member 180 is fastened to the outside thereof, the first locking step 171 of the braided net cover 170 is bound by being caught on the second locking step 181 of the outer binding member 180, and the locking grooves 182 of the outer binding member 180 may be caught on and fastened to the locking protrusions 124 of the outer housing 120, respectively.

Figure 6:
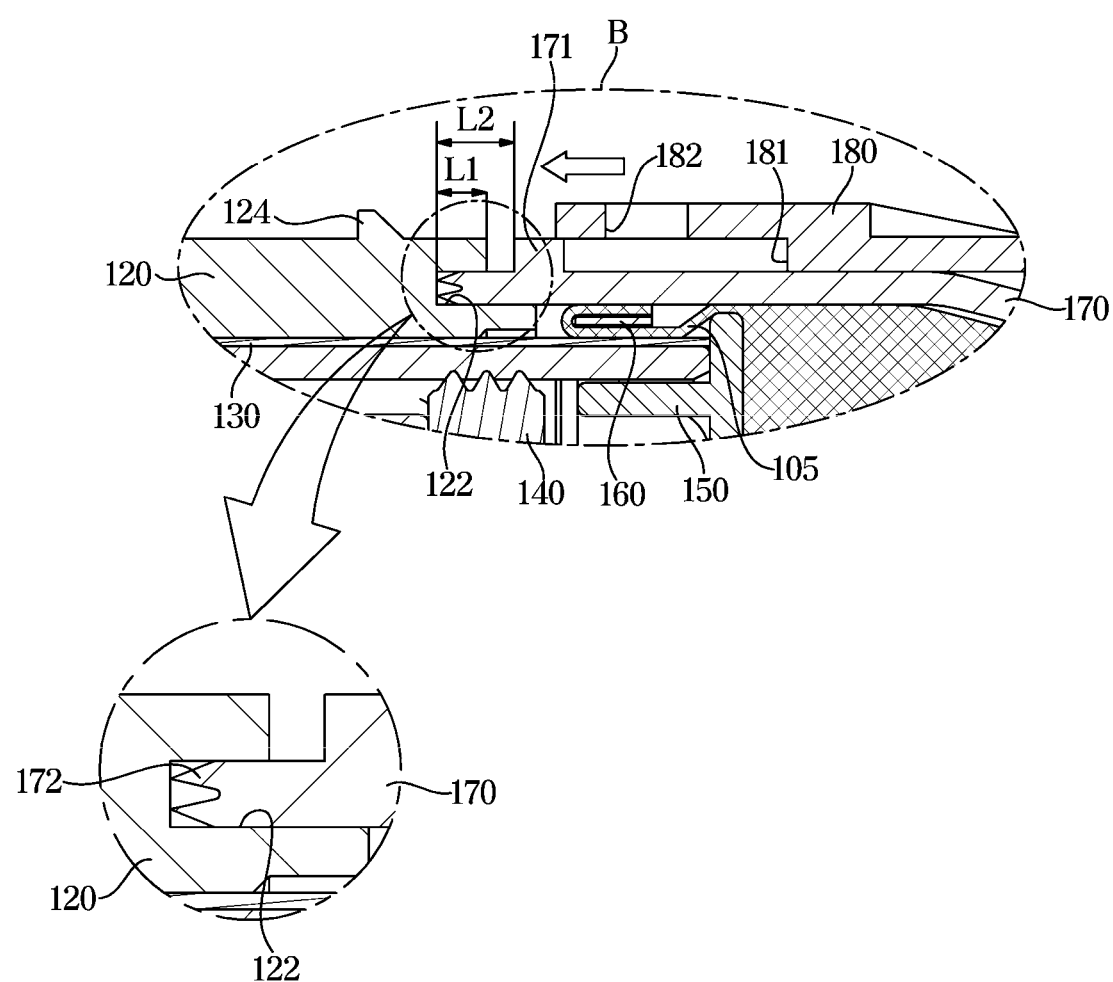
FIG. 6 is a detailed view of part B in FIG. 2, illustrating a state before the outer binding member is coupled.

As illustrated in FIG. 6, the braided net cover 170 may be set such that a distance L2 from an end thereof entering the coupling groove 122 to the first locking step 171 is longer than a depth L1 of the coupling groove 122. Therefore, the first locking step 171 of the braided net cover 170 may be maintained in a state of being spaced apart from the end of the outer housing 120 before the outer binding member 180 is fastened, and as illustrated in FIG. 5, may be in close contact with the end of the outer housing 120 by being elastically deformed after the outer binding member 180 is fastened.

As such, the end of the braided net cover 170 entering the coupling groove 122 is in close contact with an inner surface of the coupling groove 122 by being elastically deformed after the outer binding member 180 is fastened, and when the first locking step 171 is fastened to be in close contact with the end of the outer housing 120, a gap between coupling portions is sealed, so that moisture inflow from the outside to the inside may be blocked. Accordingly, corrosion of the portion where the metal shielding member 130 and the braided net 105 are connected may be prevented.

As illustrated in FIG. 6, the braided net cover 170 may include at least one sealing lip 172 provided continuously along a circumference of the end entering the coupling groove 122 and being in contact with the inner surface of the coupling groove 122 to seal a gap. The sealing lip 172 has a mountain shape in cross section and may be formed integrally with the braided net cover 170 in a process of manufacturing the braided net cover 170.

The sealing lip 172 may come into close contact with the inner surface of the coupling groove 122 by being elastically deformed inside the coupling groove 122 when the outer binding member 180 is fastened, thereby enhancing the effect of sealing the gap between the coupling portions.

As such, in the high voltage shielded connector 100 according to the present embodiment, because the braided net cover 170 and the outer binding member 180 are fastened to the outside of the portion where the metal shielding member 130 and the braided net 105 are connected, the portion where the metal shielding member 130 and the braided net 105 are connected is sealed so that moisture inflow from the outside to the inside may be blocked, and accordingly, corrosion of the portion where the metal shielding member 130 and the braided net 105 are connected may be prevented.

Further, in the high voltage shielded connector 100 according to the present embodiment, because the braided net cover 170 and the outer binding member 180 are installed on the outside of the portion where the metal shielding member 130 and the braided net 105 are connected, the binding of the connection portion of the braided net 105 may be reinforced, and accordingly, the portion where the metal shielding member 130 and the braided net 105 are connected may be protected from an external impact.

As is apparent from the above, a high-voltage shielded connector according to an embodiment of the disclosure can block moisture inflow from the outside to the inside by sealing a portion where a metal shielding member and a braided net are connected because a braided net cover and an outer binding member are fastened to the outside of the portion where the metal shielding member and the braided net are connected, so that corrosion of the portion where the metal shielding member and the braided net are connected can be prevented.

Further, the high voltage shielded connector according to an embodiment of the disclosure can reinforce the binding of the connection portion of the braided net because the braided net cover and the outer binding member are installed on the outside of the portion where the metal shielding member and the braided net are connected, so that the portion where the metal shielding member and the braided net are connected can be protected from an external impact.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A connector comprising:
   an inner housing accommodating a connection portion between an end of a cable and a connection terminal;
   a metal shielding member covering an outer surface of the inner housing;
   a binding ring binding an end of a braided net covering the cable to an outer surface of the metal shielding member;
   an outer housing covering the outer surface of the metal shielding member, a binding portion of the metal shielding member bound to the binding ring being exposed from the outer housing;
   a braided net cover covering a portion of the braided net which covers the cable and the binding ring, the braided net cover having an end coupled to the outer housing in a sealed state; and
   an outer binding member covering a portion where the braided net cover and the outer housing are coupled and maintaining the binding of the braided net cover and the outer housing.

2. The connector according to claim 1, wherein
   the outer housing comprises a coupling groove at an end to allow the end of the braided net cover to enter and be coupled.

3. The connector according to claim 2, further comprising:
   a first locking step extending along a circumference of an outer surface of the braided net cover;
   a second locking step provided on an inner surface of the outer binding member to be caught on the first locking step;
   a plurality of locking protrusions provided on an outer surface of the outer housing; and
   a plurality of locking grooves provided on the outer binding member to be fastened to the plurality of locking protrusions.

4. The connector according to claim 3, wherein
   the braided net cover includes an elastically deformable material.

5. The high voltage shielded connector according to claim 4, wherein
   a distance from an end of the braided net cover entering the coupling groove to the first locking step is configured to be longer than a depth of the coupling groove.

6. The connector according to claim 4, wherein
   the first locking step is configured to maintain in a state of being spaced apart from an end of the outer housing before the outer binding member is fastened.

7. The connector according to claim 4, wherein
   the first locking step is configured to contact with an end of the outer housing by being elastically deformed after the outer binding member is fastened.

8. The connector according to claim 4, wherein
   the braided net cover comprises at least one sealing lip provided continuously along a circumference of the end entering the coupling groove and being in contact with an inner surface of the coupling groove to seal a gap.

9. The connector according to claim 8, wherein
   the sealing lip has a mountain shape in cross section and is integral with the braided net cover.

* * * * *